# UNITED STATES PATENT OFFICE.

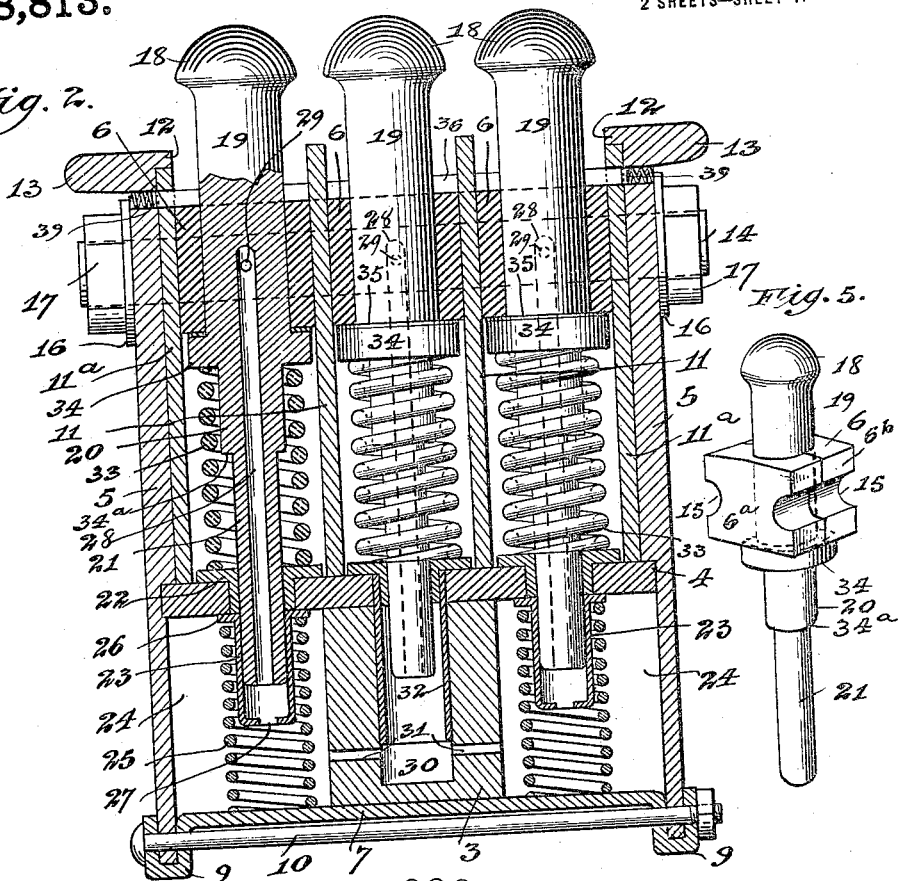

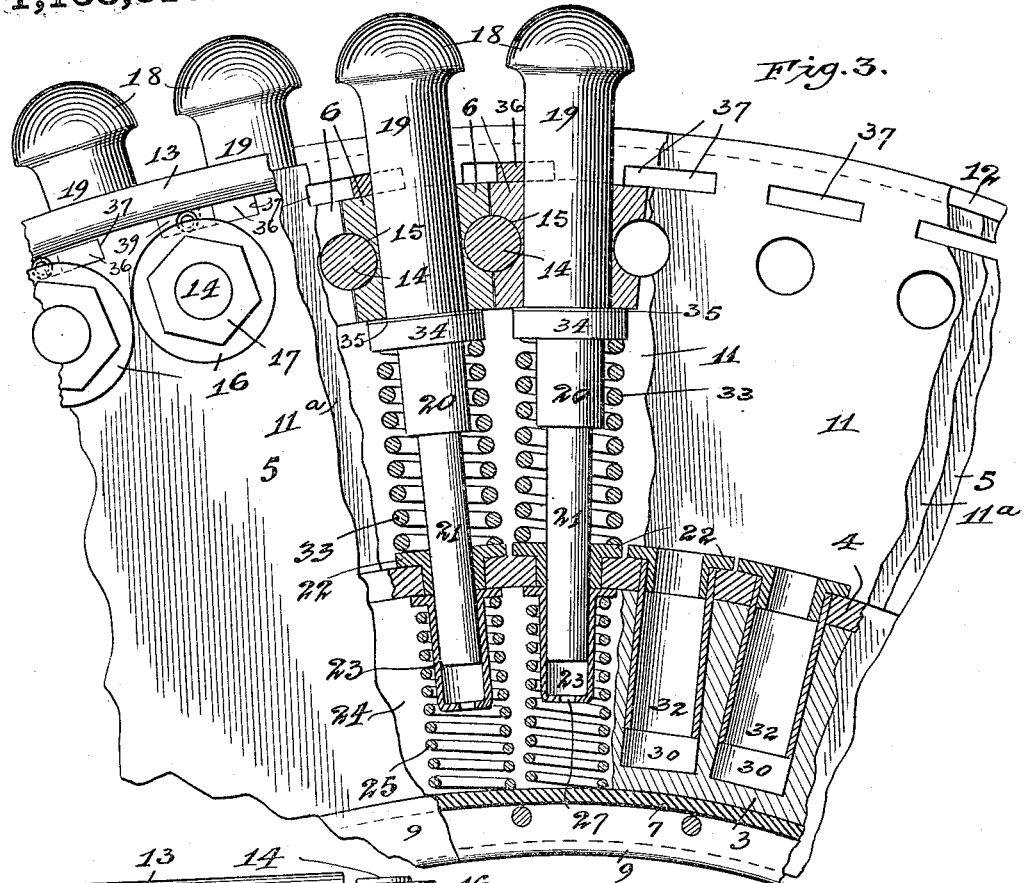
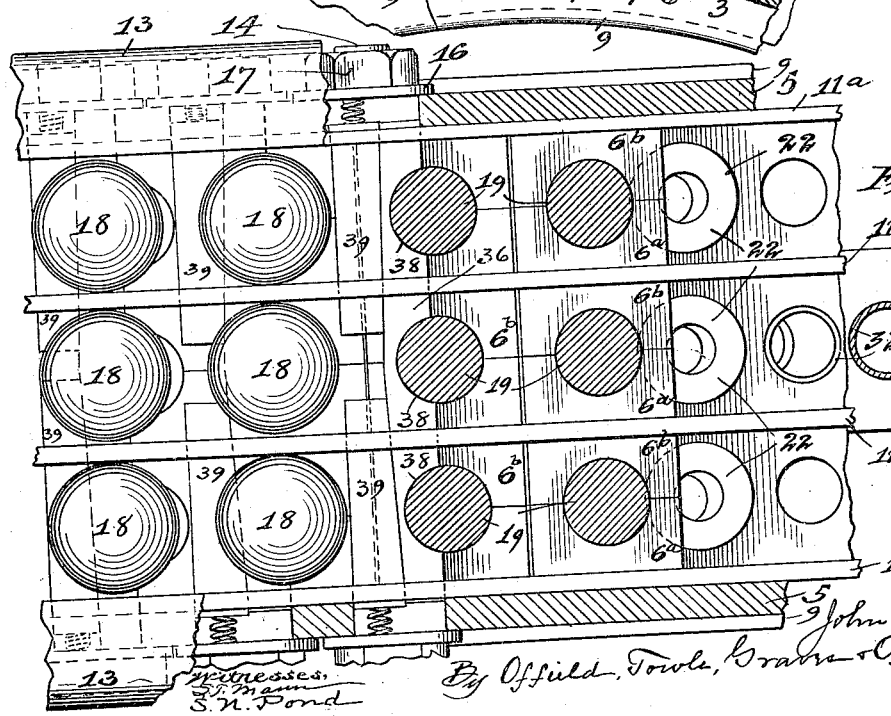

JOHN R. VICKERY, OF CHICAGO, ILLINOIS.

VEHICLE-TIRE.

1,138,813.

Specification of Letters Patent.   Patented May 11, 1915.

Application filed December 28, 1912.   Serial No. 738,995.

*To all whom it may concern:*

Be it known that I, JOHN R. VICKERY, a citizen of the United States, residing at Chicago, in the county of Cook and State of Illinois, have invented certain new and useful Improvements in Vehicle-Tires, of which the following is a specification.

This invention relates to improvements in tires for automobiles and other vehicles, notably, motor trucks; and has for its main object to provide a practical, economical and durable substitute for the pneumatic and solid rubber tires commonly employed to afford a cushion tread for such wheels, and which shall be capable of application to standard makes and sizes of wheels.

My present invention, which is in the nature of an improvement upon the subject matter of an application filed by me on the 13th day of July, 1912, Serial No. 709,209, relates to that general class of spring tires which employ a series of radially movable spring-backed members mounted within and projecting from the rim of the wheel. Numerous specific forms of this general type of spring tire have heretofore been proposed, but they have failed of adoption and use to any substantial extent by reason of various mechanical defects, such as liability to excessive wear, lack of sufficient strength to meet abnormal conditions of travel, a tendency to create an objectionable amount of clatter and other noise, and the difficulty of replacing broken or worn out parts. Simplicity of repair in the matter of replacing broken or worn parts, and easy accessibility to such parts without necessitating the dismantling of the tire structure to any appreciable extent, are conditions which are essential to the practical utility and success of any tire of this character; and a prominent object had in view in the development of the present invention has been to devise a spring tire structure wherein each of the spring-pressed plungers and its main bearing shall constitute a complete and separable structural unit that, by a partial removal of the clamping or fastening means of a transverse row of such units, shall be capable of being removed and replaced without disturbing the other units of the system.

A further object of the invention is to provide a construction which will permit the use of an integral or one-piece plunger formed with a plunger-head and a shoulder limiting the outward movement of the plunger. Such integral or one-piece plunger can be very simply and cheaply made as a drop forging; but difficulties of assembling have heretofore rendered the use of such a plunger impracticable.

By my present invention I am able to use an integral or one-piece plunger without encountering any difficulties in assembling, and this I accomplish, in the preferred form of the invention, by making the main bearing-block of the plunger in mating halves.

Other objects of the invention are to provide an improved construction of silencer for preventing rattling of the plungers in their bearings and taking up wear, as well as preventing the loss of lubricant by keeping the bearings tight and acting as a safety or emergency retainer for the plunger bearings in case the main holding or clamping means of the latter should break; and to provide a construction adapted to relieve the plungers of abnormal shock due to bad road conditions when said plungers have been compressed to their limit.

The invention in one practical form in which it may be embodied, is illustrated in the accompanying drawings, in which—

Figure 1 is a side elevational view, partly broken out, of an automobile wheel equipped with the improved tire of my invention. Fig. 2 is an enlarged transverse section through the hollow rim of the tire and showing one transverse row of three units, with the plungers of two of said units appearing in elevation and the third plunger partially in elevation and partially in axial longitudinal section. Fig. 3 is an enlarged side view, partly in elevation, and partly in longitudinal section, in different vertical planes to fully illustrate different features in the rim and internal structure of the tire. Fig. 4 is an enlarged top plan view, partly in section, and with parts removed for greater clearness. Fig. 5 is a detail perspective elevation of one of the plungers and its bearing-block constituting in the main one of the separable units of the structure.

Referring to the drawings, 1 designates the hub, 2 the spokes, and 3 the felly of the wheel, which parts may be all as usual in automobile and like wheels, except for modifications of the felly to accommodate the central row of plungers, as hereinafter referred to. The rim, which is mounted directly on the felly 3, is a hollow box-like structure, comprising essentially an inner rim-band 4 preferably in a single piece shrunk on the felly, a pair of annular side-plates 5, and a series of individual bearing-blocks 6 that are grouped side by side in longitudinal and transverse rows and unitedly make up the outer peripheral wall or band of the hollow rim. The annular side-plates 5 extend width-wise from the outer sectional periphery inwardly past the inner edges of the inner rim-band 4 to points opposite and slightly inwardly of the inner periphery of the felly 3. Fitted to the inner periphery of the felly 3 is another sectional band comprising a series of curved sections 7 of a width equal to that of the rim-band 4 and notched at their ends to straddle the spokes 2, as shown at 8 in Fig. 1. The sections 7 of this inner band are formed with channel flanges 9 that seat the inner edges of the side-plates 5, and are securely tied to the latter by through-bolts 10, as clearly shown in Fig. 2.

Disposed inwardly of and parallel with the side-plates 5 is a pair of intermediate annular partition plates 11, the inner edges of which are fitted to the rim-band 4, while their outer edges project flush with the outer edges of the side-plates 5. I may also employ an additional pair of annular plates 11a, similar to the plates 11 but lying against and constituting inner linings for the main rim side-plates 5, the outer edges of said liner plates 11a being confined by short inner lateral flanges 12 on said rim side-plates 5. The side plates 5 are also preferably further provided with substantial outer lateral flanges 13 constituting, with the outer edges of the intermediate partition plates 11, the extreme outer periphery of the hollow rim, and serving to come in contact with the surface of the road under an extreme or full compression of the plungers hereinafter described, and thus save said plungers from the injurious results of extreme shocks and abnormally severe road conditions.

The bearing-blocks 6 of the two outer longitudinal rows are confined between the annular plates 11 and 11a on each side of the rim structure, as clearly shown in Fig. 2, while the intermediate longitudinal row of bearing-blocks is similarly confined between the two intermediate annular partition plates 11. These bearing-blocks are preferably made in mating halves 6a and 6b, as shown and are rigidly locked in their respective positions in the structure by means of a series of transverse clamp-bolts 14 that engage semi-circular grooves 15 in opposite sides of the bearing-blocks, as shown in Figs. 3 and 5; each of said clamp-bolts lying between two adjacent transverse rows of bearing-blocks, as shown in Fig. 3. Each end of the bolt 14 is threaded and receives a washer 16 and a clamp-nut 17. The bearing-blocks 6 are centrally bored to receive the individual plungers, each of which latter consists preferably of an integral structure comprising a plunger-head 18 and a plunger-stem consisting of an outer relatively wide portion 19 slidable in the bearing block, an intermediate narrow portion 20, and an inner still narrow portion 21. This inner narrow portion 21 of the stem is slidably mounted in a bushing or wear-sleeve 22 fitted to an aperture in the inner rim-band 4; and, in the case of the outer row of plungers, it also engages a sleeve or thimble 23 disposed within an annular lubricant-chamber 24 located on either side of the felly 3, and normally forced outwardly by a spring 25 engaging the inner band 7 and a shoulder or flange 26 on the outer end of the thimble or sleeve 23. The inner end of the thimble 23 has a hole 27 formed therethrough, and each plunger-stem has an axial bore 28 forming a lubricant-duct that communicates at its outer end with lateral ducts 29 leading to the bearing of the plunger-stem in its bearing-block 6, whereby to afford an ample supply of lubricant to said bearing as each plunger travels throughout the lower half of each revolution of the wheel. The felly 3 is also radially socketed to provide a lubricant space 30 for the intermediate row of plunger-stems, the space 30 communicating with the main lubricant-chambers on either side thereof by lateral ducts 31, and preferably having a metal lining 32. The intermediate partition plates 11 divide the space bounded by the annular side-plates 5, or their linings 11a when employed, and the inner and outer rim-bands into three annular chambers which accommodate the main cushioning springs 33 of the plungers. These springs abut at their inner ends against the outer ends of the inner bearing members 22, while their outer ends engage collars 34 that surround the intermediate portions 20 of the plunger-stems, and also form stops limiting the outward movement of the plungers. These collars, in the preferred form of the invention, are formed integral with the plunger-stems themselves, and preferably have on their outer sides non-metallic washers 35 designed to deaden the sound of the impact of the collars against the inner ends of the bearing-blocks when the plungers are released from load and shot outwardly by the cushioning springs. By making the bearing-blocks 6 in mating halves 6a and 6b, as shown, it is entirely feasible to employ a plunger having an integral head and spring abutment and stop without creating any difficulties in assembling. Between the intermediate and inner portions of the plunger-stem is formed an annular shoulder 34a that acts as a stop to limit the inward movement of the plunger under load.

The lubricating means herein shown does not constitute any part of my present invention, the same being disclosed and claimed in my former application hereinabove referred to; and, in my present construction, in lieu thereof I may introduce lubricant into the outer chambers containing the main cushioning springs 33, whence the lubricant will readily work its way into both the inner and outer bearings of the plunger-stems.

In order to prevent rattling of the plunger-stems in their respective bearing-blocks 6 which may result from excessive wear, I provide means for continuously holding the plunger-stems against lateral vibration, said means also serving the additional function of confining the lubricant to the bearings and preventing its escape to any serious extent from the outer periphery of the rim structure. The means for securing these ends as applied to each transverse row of plungers is best illustrated in Figs. 3 and 4 and comprises a follower-bar 36 that extends through slots 37 in the side-plates 5 and intermediate partition and liner plates 11 and 11ª, respectively, and overlies the outer surfaces of the plunger-bearing-blocks 6. This follower-bar 36 is formed with three semi-circular notches 38 that are shaped to an exact bearing upon the projecting portions of the plunger-stems. The edge of the bar 36 remote from the plunger-stems is slightly inclined from its center toward each end, as clearly shown in Fig. 4; and said inclined edge portions are engaged by wedges 39 also inserted through the slots 37 behind the follower-bar 36. Slots 37 are, of course, of sufficient length to accommodate a gradual movement of the follower-bar toward the plunger-stems as wear occurs between the two; and to keep the follower-bar in snug contact with the plunger-stems at all times, I preferably force the wedges 39 constantly inwardly by means of compression springs 40 that are confined between the outer ends of the wedges and the washers 16 of the clamp-bolts 14, as clearly shown in Figs. 3 and 4. This silencing and compensating mechanism for bearings may be applied inwardly of the bearing-blocks 6 in lieu of outwardly thereof as shown, if desired.

From the described construction it will readily be seen how the main objects and advantages of the invention are attained therein. In the event that one of the cushioning springs should break, or any other accident occur requiring the withdrawal of a broken or injured part and its replacement by a new part, by simply withdrawing the nuts and washers of two adjacent clamp-bolts and partially retracting said bolts, the broken unit consisting of the plunger, its main bearing-block, and the cushioning spring can be readily withdrawn and new similar parts substituted, the operation requiring but a few moments time. The making of the bearing-block 6 in mating halves also makes possible the use of integral or one-piece plungers, as described, since the bearing-blocks can be readily positioned around the plungers after the latter have themselves been assembled in the tire structure; and with the fastening means described, the making of the bearing-blocks in two parts in no wise weakens the structure. The invention, however, is by no means limited to a multi-part bearing-block, but an integral bearing-block is fully within the scope and purview thereof. It will also be noted that the plungers, as mounted, are capable of turning freely on their longitudinal axes, and this is a feature of much practical merit, since it facilitates the angular movement of the wheels in steering.

While I have described one practical embodiment of my invention, I do not limit the same in all respects to the precise details shown and described, since these may be modified to some extent without involving any departure from the principles involved or sacrificing any of the advantages secured by the invention.

I claim—

1. In a vehicle tire structure, the combination of an inner rim band adapted to engage the felly of the wheel, annular side-plates secured to said inner rim band, an outer sectional rim band comprising a plurality of bearing-blocks disposed side by side between said side-plates and grooved on their adjacent transverse sides, clamp-bolts extending through the grooves of said bearing-blocks and said side-plates and securing said bearing-blocks in place in the rim structure, and spring-pressed plungers slidably mounted in said bearing-blocks.

2. In a vehicle tire structure, the combination of an inner rim band adapted to engage the felly of the wheel, annular side-plates secured to said inner rim band, an outer sectional rim band comprising a plurality of bearing-blocks disposed side by side between said side-plates and grooved on their adjacent transverse sides, clamp-bolts threaded on each end extending through the grooves of said bearing-blocks and said side-plates, nuts on both ends of said clamp-bolts permitting the withdrawal of the latter from either side of the rim structure, and spring-pressed plungers slidably mounted in said bearing-blocks.

3. In a vehicle tire structure, the combination of an inner rim band adapted to engage the felly of the wheel, annular side-plates secured to said inner rim band, an intermediate annular partition plate mounted on said inner rim band, an outer sectional rim band comprising a plurality of rectangular bearing-blocks arranged side by side between said side-plates and partition plate and grooved on their adjacent transverse sides, clamp-bolts extending through the grooves of said bearing-blocks and said side-plates and partition plate and securing said bearing-blocks in place in the rim structure, and spring-pressed plungers slidably mounted in said bearing-blocks.

4. In a vehicle tire structure, the combination of a rim formed with radial bearings in its outer periphery, spring-pressed plungers slidably mounted in said bearings, and means for taking up wear and preventing rattling of said plungers in their bearings comprising followers overlying the outer periphery of said rim and fitted to and engaging one side of said plungers adjacent to one end of said bearings, and means for forcing said followers against said plungers.

5. In a vehicle tire structure, the combination of a rim formed with radial bearings in its outer periphery, spring-pressed plungers slidably mounted in said bearings, and means for taking up wear and preventing rattling of said plungers in their bearings comprising followers overlying crosswise the outer periphery of said rim and fitted to and engaging one side of said plungers adjacent to one end of said bearings, and springs constantly urging said followers against said plungers.

6. In a vehicle tire structure, the combination of a channel rim, a plurality of individual bearing-blocks arranged side by side within circumferential and transverse rows within and unitedly forming an outer peripheral wall for said rim, means for securing said bearing-blocks in place, a corresponding series of spring-pressed plungers slidably mounted in said bearing-blocks, and means for taking up wear and preventing rattling of said plungers in said bearing-blocks comprising follower-bars arranged transversely of said rim and overlying one end of said bearing-blocks, each of said follower-bars having notches in one edge thereof engaging one side of a transverse row of plungers, and wedge members backing said follower-bars and acting to force the latter snugly against said plungers.

7. In a vehicle tire structure, the combination of a channel rim having slotted side-walls and slotted intermediate partition plates, a plurality of individual bearing-blocks arranged side by side in circumferential and transverse rows between said side-walls and partition plates and unitedly forming an outer peripheral wall for said rim, means for securing said bearing-blocks in place, a corresponding series of spring-pressed plungers slidably mounted in said bearing-blocks, transversely disposed follower-bars mounted in the slots of said side-walls and partition plates and overlying one end of said bearing-blocks, each of said follower-bars having notches in one edge thereof engaging one side of a transverse row of plungers, transversely disposed wedge members also mounted in said slots and engaging the opposite edge of said follower-bars, and springs operating to continuously force said wedge members inwardly and thereby crowd said follower-bars against said plungers.

8. In a vehicle tire, the combination with a channel rim, of a plurality of integral or one-piece spring-pressed plungers each formed with a head on its outer end and an intermediate annular projection or shoulder forming a spring abutment and a stop limiting the outward movement of the plunger, a plurality of independently removable bearing-blocks for said plungers assembled side by side between the side-walls of said rim, each of said bearing-blocks comprising mating sections embracing a plunger-stem between said plunger-head and annular projection, and means for securing said bearing-blocks rigidly in place.

JOHN R. VICKERY.

Witnesses:
  JOYCE M. LUTZ,
  SAMUEL N. POND.